W. C. MARTIN.
VALVE.
APPLICATION FILED SEPT. 22, 1910.
1,057,757.
Patented Apr. 1, 1913.
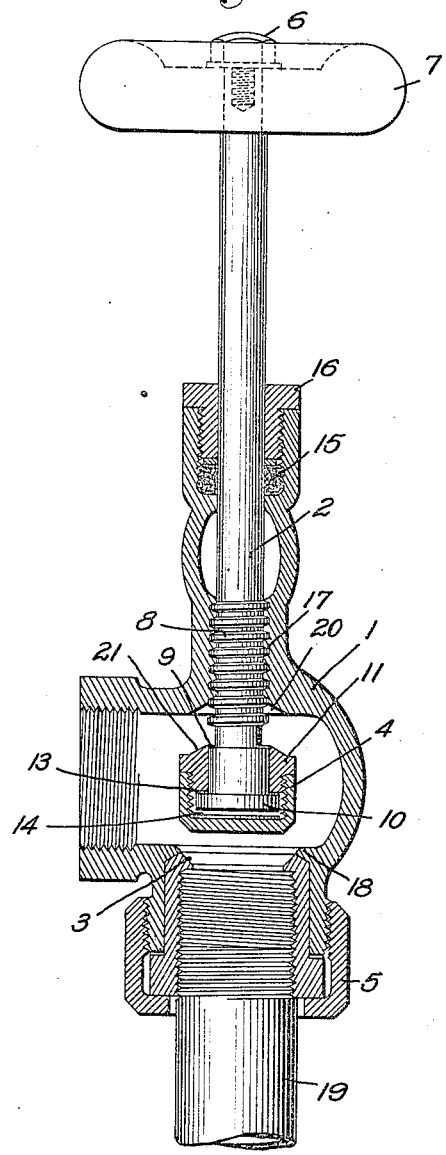
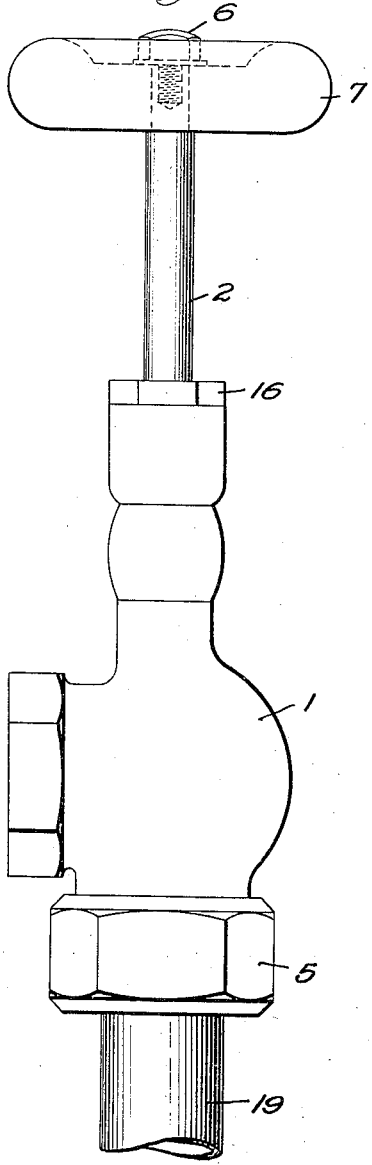
Witnesses:
Ernest A. Telfer
Carl L. Choate
Inventor:
William C. Martin
by Emery, Booth, Janney & Varney,
Att'ys.

UNITED STATES PATENT OFFICE.

WILLIAM C. MARTIN, OF BOSTON, MASSACHUSETTS.

VALVE.

1,057,757.

Specification of Letters Patent.

Patented Apr. 1, 1913.

Application filed September 22, 1910. Serial No. 583,219.

*To all whom it may concern:*

Be it known that I, WILLIAM C. MARTIN, a citizen of the United States, and a resident of Boston, in the county of Suffolk and Commonwealth of Massachusetts, have invented an Improvement in Valves, of which the following description, in connection with the accompanying drawings, is a specification, like letters on the drawings representing like parts.

This invention relates to certain improvements in valves.

It consists in certain novel features of construction and operation and in certain combinations of parts, all of which will be more fully hereinafter set forth.

The objects of my invention are to provide a valve in which the seat may be changed in case it becomes cut or worn, one in which the body and the bonnet are one piece, one which may be attached to or detached from a pipe without turning either the valve or the pipe, one having an improved device for packing the valve stem, and one having an improved disk.

Referring to the drawings: Figure 1 is a vertical, longitudinal, sectional view of one embodiment of my invention; and Fig. 2, a side elevation thereof.

While my invention is of general application, being adapted for use with all products commonly circulated through pipes, it is especially valuable in use with steam.

The principal members of the embodiment of my valve here shown are the body 1, the valve stem 2, the removable seat 3 and the disk 4. The body 1 as here shown comprises not only what is generally known as the body but also what is usually called the bonnet of the valve. The top of this body contains the stuffing box 15, adapted to receive the gland 16, and a threaded passage 17 adapted to receive the threaded portion of the valve stem, while the bottom of the body is threaded on the outside to receive a nut 5 adapted to hold in place the removable seat 3. The valve stem is of the usual type, preferably having provision 6 for attaching a suitable handle 7, having the threaded portion 8 suitably located, the shoulder 9 and the head 10. The removable seat 3 may have a flange at one end and is preferably threaded on the inside to receive a pipe. The disk 4 is threaded on the inside to receive the threaded disk top 11.

The assembly of the valve is accomplished as follows: The washer 13 and the disk top 11 are slipped in that order over the top of the valve stem and moved down against the head 10. The round plate 14 is then inserted in the disk 4 and the latter is screwed over the threaded portion of the disk top 11. The valve stem is then pushed up through the hole in the bottom of the body 1, and the threaded portion 8 screwed into 17. Packing is now introduced into the stuffing box 15, the gland 16 slipped over the top of the valve stem and screwed into the stuffing box. The handle 7 may now be attached by the screw 6. Next the seat 3 is placed in position as shown inside the bottom of the body and the nut 5 is screwed onto the body to hold the seat in place. This forces the sides of the top of the seat against the internal rib or projection 18, making a tight joint. The valve is now assembled. In use it is usual to secure the seat 3 to the pipe 19 before screwing up the nut 5. By doing this the valve may be attached to a pipe without turning either the valve or the pipe. This is of especial value in substituting new valves for old ones on radiators where the pipes corresponding to 19 are usually partly concealed below the floor.

The top of the disk top 11 is formed to fit into the seat 21 when the valve is opened wide, making a steam tight joint. When this is done packing in the stuffing box 15 may be changed without leakage, even when there is pressure in the valve. This feature also relieves the packing when the valve is open and so prolongs its life.

The use of my invention is that of any globe valve, rotation of the handle 7 increasing or decreasing the opening between the disk 4 and the seat 3.

While I have described the construction and use of my several improvements in a single valve, I do not wish to be limited to their use in combination with each other, but to claim each broadly.

Having thus fully described one embodiment of my invention, what I desire to claim by Letters Patent is:

1. A valve comprising in combination a body; a seat provided with a flange and having a slip fit with said body; means to draw said seat into position relative to said body, said seat being provided with an interiorly threaded portion and terminating at its flange.

2. A valve comprising, in combination, a body, a valve stem, a seat effectively terminating in a seat flange and having a slip fit with said body, and an interiorly threaded portion integral with said seat, said valve stem, seat and threaded portion being axially alined.

3. A valve comprising in combination a body; a valve stem; a pipe attachment member effectively terminating in a seat flange and having a slip fit with said body; and an interiorly threaded portion integral with said pipe attachment member, said valve stem, pipe attachment member and said threaded portion being axially alined.

4. A valve comprising in combination a body; a valve stem; a pipe attachment member effectively terminating in a seat flange and separate from but attachable to said body without relative rotation of said body and said pipe attachment member; and an interiorly threaded portion forming a part of said pipe attachment member, said attachment member and said threaded portion having a common axis.

5. A valve comprising, in combination, a body, a seat member provided with an effective terminal flange and pipe retaining means interior of said seat member.

6. A valve comprising, in combination, a body having a neck provided with an internal rib, a seat having an end formed to fit said rib and a threaded portion for connection with a pipe, means for setting said seat tightly against said rib, and a disk adjustable past said rib into engagement with said seat.

7. A valve comprising, in combination, a body provided with a neck having a smooth interior wall and a stop projection, a seat having an end for engagement with said projection and a threaded portion for connection with a pipe, means for setting said seat tightly against said projection, and a disk adjustable past said stop projection into engagement with said seat.

8. A valve comprising, in combination, a body having a neck, a threaded pipe receiving seat for insertion into said neck, stop means substantially at the juncture of said body and neck for tight fitting engagement with one end of said seat, means for setting said seat against said stop means, and a disk for engagement with the same end of said seat.

In testimony whereof, I have signed my name to this specification in the presence of two subscribing witnesses.

WILLIAM C. MARTIN.

Witnesses:
PRESTON UPHAM,
HERBERT L. OGDEN.